United States Patent [19]

Rolf

[11] Patent Number: 4,493,597

[45] Date of Patent: Jan. 15, 1985

[54] NUT LOCK ASSEMBLY

[75] Inventor: Jeffrey O. Rolf, Mentor, Ohio

[73] Assignee: Eaton Corporation, Cleveland, Ohio

[21] Appl. No.: 415,066

[22] Filed: Sep. 7, 1982

[51] Int. Cl.³ .............................................. F16B 39/36
[52] U.S. Cl. .................... 411/198; 411/193; 411/326; 411/235
[58] Field of Search ............... 411/186, 193, 196, 201, 411/198, 206, 207, 221, 227, 228, 191, 197, 235, 325, 326-331

[56] References Cited

U.S. PATENT DOCUMENTS

| 338,866 | 3/1886 | Paisley | 411/331 |
|---|---|---|---|
| 563,416 | 7/1896 | Rowland | 411/193 |
| 712,905 | 11/1902 | Cannon | 411/330 |
| 1,105,123 | 7/1914 | Bardwell | 411/197 |
| 1,241,181 | 9/1917 | Wilhelm | 411/201 |
| 1,302,105 | 4/1919 | Warren | 411/196 |
| 1,567,653 | 12/1925 | Kohn | 411/197 |
| 1,651,188 | 11/1927 | Cole | 411/331 |

FOREIGN PATENT DOCUMENTS

| 490445 | 12/1918 | France | 411/330 |
|---|---|---|---|
| 10321 | of 1896 | United Kingdom | 411/197 |

Primary Examiner—Thomas J. Holko
Assistant Examiner—Neill Wilson
Attorney, Agent, or Firm—C. H. Grace; H. D. Gordon

[57] ABSTRACT

A removable reusable nut lock system (10) of the locking cap type for positively selectively removably retaining a standard nut (12) on the externally threaded end of a shaft (14) is provided. The lock nut assembly comprises an internally threaded bore (22) provided in the end of an externally threaded shaft having internal threads (24) of an opposite hand as the external threads (16) on the shaft. A locking cup member (26) is provided for slipping over the outer periphery of the nut for rotation therewith and the locking cup member is provided with a flange (32) having a plurality of ramp type ratchet teeth (38) on the outer periphery thereof. A locking cap member (28) is provided having an externally threaded stud (50) fixed thereto and a plurality of locking fingers (58, 60) extending radially outwardly and downwardly therefrom. The resilient locking fingers are designed to ratchet over the ratchet teeth of the locking cup upon tightenting of the locking.cap and will resist rotation of the nut member and locking cup in the removal direction of rotation of the nut relative to the externally threaded shaft.

3 Claims, 5 Drawing Figures

NUT LOCK ASSEMBLY

BACKGROUND OF THE INVENTION

1. Field of the Invention

The present invention relates to a nut lock assembly for positively retaining a nut upon a threaded shaft and more particularly relates to a nut lock assembly of the reusable, selectively removable, locking cap type for positively retaining a standard nut, such as a standard hex nut, upon an externally threaded shaft.

2. Description of the Prior Art

It is well known, of course, that bolts hold parts together by exerting pressure on the mating surfaces. Needed pressure is developed by tightening the bolt and/or tightening a nut upon the bolt. It is also well known, especially for nut and bolt assemblies utilized in modern machinery and equipment or the like which are subject to movement or vibration or other forces which may tend to cause unwanted loosening of the nut upon the bolt that it is desirable that the nut be positively locked, that is prevented from relative rotation relative to the bolt or other threaded shaft. Many types of nut lock assemblies are known in the prior art and include, among others, the locking teeth or ramp type as may be seen in greater detail by reference to U.S. Pat. Nos. 2,253,241 and 2,959,204, both of which are hereby incorporated by reference. This type of a nut lock system was not satisfactory for all purposes as the locking action required the maintenance of at least a predetermined minimum tension in the bolt and further required that the locking teeth become inbedded in a bearing surface which might be highly undesirable.

Nut lock assemblies of the locking cap type are also well known in the art as may be seen by reference to U.S. Pat. Nos. 1,105,123; 1,241,181 and 1,567,653, all of which are hereby incorporated by reference. The prior art nut lock assemblies of the locking cap type were not totally satisfactory as they did not permit locking of the nut to the bolt at relatively small incremental relative rotational positions thereof, they required specially configured nuts and/or bolts, they required rather complicated machining and/or assembly operations such as transverse boring of the nut and/or bolt, and/or they did not exert a force tending to resist loosening of the bolt upon the nut which tended to increase with increased relative rotation of the nut in the removal direction of relative rotation.

SUMMARY OF THE INVENTION

In accordance with the present invention, the drawbacks of the prior art are overcome or minimized by the provision of a nut lock assembly of the locking cap type which utilizes a standard nut, which utilizes a standard externally threaded shaft provided with an axially extending threaded bore opening to the free end thereof, which allows the nut to be locked in small incremental rotational positions relative to the externally threaded shaft and which tends to increase the locking force with increased tendencies of the nut to be rotated in the removal direction of relative rotation. The drawbacks of the prior art are also overcome or minimized by providing a nut lock assembly of the locking cap type wherein the locking cap is reusable and selectively removable.

The above is accomplished by providing an externally threaded shaft, such as the externally threaded shaft of a pinion gear or the shank of a bolt, upon which a standard nut, such as a standard hex nut, is threadably receivable. An axially extending internally threaded bore is provided in one end of the externally threaded shaft, the internal threads of which are of the opposite hand as the external threads. A locking cup is provided, preferably a sheet metal stamping, which has a centrally located aperture therethrough of a cross sectional shape closely conforming to the external shape of the standard nut for nonrotationally receiving the outer periphery of the nut therethrough. A transversely extending flange of the locking cup is provided with sawtooth type or ramp teeth inclined radially outwardly therefrom. A locking cap member is provided which includes a base portion having an externally threaded stud extending therefrom which will be threadably received within the internally thread bore provided in the externally threaded shaft and a plurality of finger or ear members extending axially in the direction of the externally threaded stud. The finger or ear members are separated from the axis of the stud by a distance generally equal to the radius of the flange portion of the locking cup at the base of the sawteeth thereof. The free ends of the fingers have a circumerential width no greater than the circumerential width of the sawteeth for ratcheting engagement therewith.

Briefly, to assemble and positively lock a nut to a threaded shaft by utilizing the nut lock assembly of the present invention, a standard nut is threaded and tightened upon the externally threaded shaft, the locking cup is then inserted over the nut, the locking cap is then threadably attached to the externally threaded shaft by means of the stud which is threadably received within the internally threaded bore provided within the externally threaded shaft. As the locking cap is threaded down tightly, the finger portions will ratchet over the sawteeth on the flange of the locking cup until the locking cap is tightly received upon the end of the externally threaded shaft. Any tendency for the nut to be rotated relative to the shaft in the back off or loosening direction thereof, will cause the fingers of the locking cap to be engaged by the radially extending surfaces or shoulders of the sawteeth on the locking cup which will cause the locking cap to be further tightened upon the externally threaded shaft. Accordingly, any tendency of the nut to move in the loosening or back off direction of rotation relative to the externally threaded shaft will result in the locking cap being more tightly received upon the externally threaded shaft and thereby resisting such loosening of the nut upon the externally threaded shaft. For removal, the fingers of the locking cap are simply resiliently deformed outwardly to clear the sawteeth of the locking cup and then the locking cap is threaded off the end of the externally threaded shaft.

Accordingly, it is an object of the present invention to provide a new and improved nut lock assembly of the locking cap type.

A further object of the present invention is to provide a nut lock assembly of the locking cap type which allows a standard nut to be locked to an externally threaded shaft at relatively small incremental rotational positions thereof and which will provide a resistance to unintentional removal of the nut which tends to increase with rotation of the nut in the loosening direction of rotation thereof relative to the externally threaded shaft.

These and other objects and advantages of the present invention will become apparent from a reading of

DESCRIPTION OF THE PREFERRED EMBODIMENT

Figure 1:
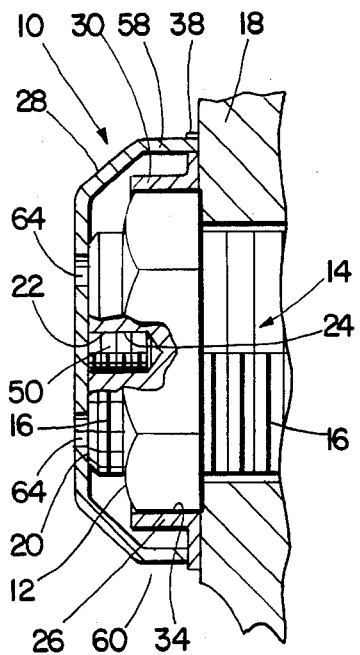
FIG. 1 is a side view, partially in section, of a standard nut locked upon an externally threaded shaft utilizing the nut lock assembly of the present invention.

Certain terminology will be used in the following description for convenience in reference only and will not be limiting. The words "upwardly," "downwardly," "rightwardly" and "leftwardly" will designate directions in the drawings to which reference is made. The words "inwardly" and "outwardly" will refer to directions toward and away from, respectively, the geomtric center of the device and designated part thereof. Said terminology will include the words above specifically mentioned, derivatives thereof and words of similar import.

Referring now to FIG. 1, the nut lock assembly 10 of the present invention may be seen as locking a standard nut 12 upon the externally threaded end of a shaft 14, Preferably, nut 12 is provided with a plurality of flat surfaces about the exterior periphery thereof, such as the six flats commonly seen in a hex nut or the like. Shaft 14 is provided with external threads 16 on the free end thereof for threadably receiving the internal threads (not shown) of the nut 12, External threads 16 on the end of shaft 14 and the internal threads of nut 12 are, for purposes of this illustration, right handed threads. Shaft 14 may be any externally threaded shaft, such as the shaft of a pinion gear or the externally threaded shank of a bolt. As is known in the art, nut 12 is tightened against a surface of member 18, which may be a gear or the like, to achieve a desired tension in shaft 14 for clamping purposes such as for preloading a bearing (not shown) or the like.

The free end 20 of shaft 14 is provided with an internally threaded axially extending bore 22 the internal threads 24 of which are of the opposite hand, in this case left handed, of the external threads 16.

Other than for the provision of internally threaded bore 22 at the externally threaded end of shaft 14, shaft 14 is a standard externally threaded shaft.

Figure 2:
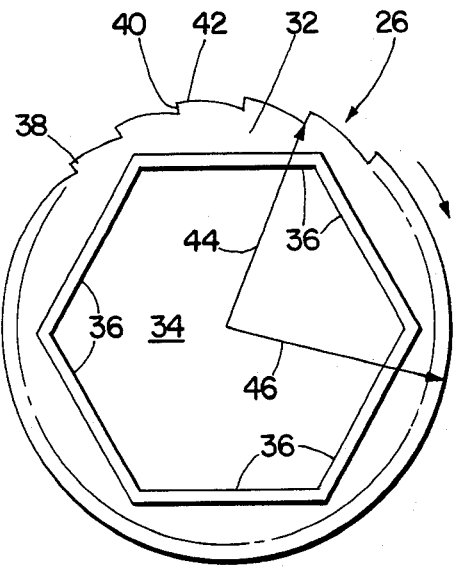
FIG. 2 is a top view of the locking cup of the present invention.
Figure 3:
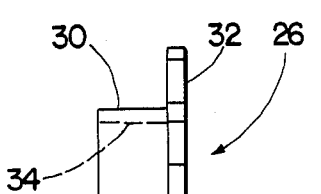
FIG. 3 is a side view of the locking cup of FIG. 2.
Figure 4:
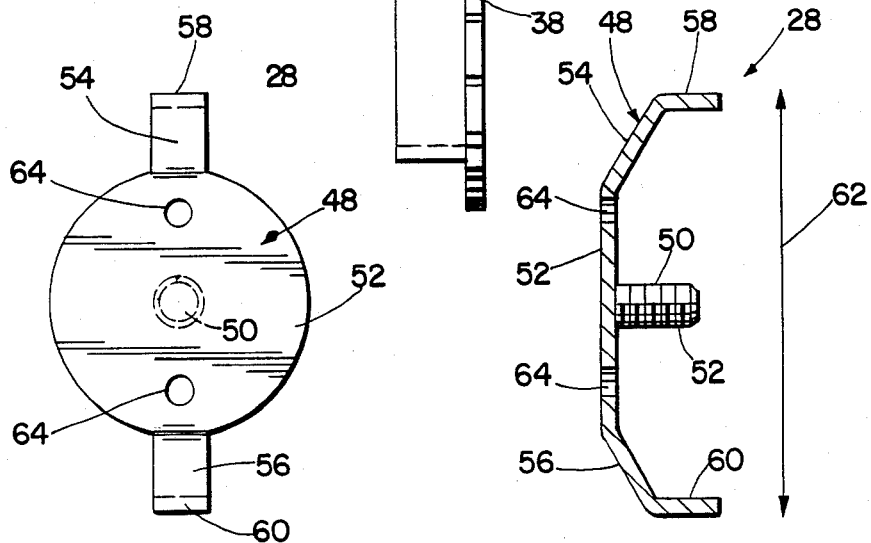
FIG. 4 is a top view of the locking cap of the present invention.
Figure 5:
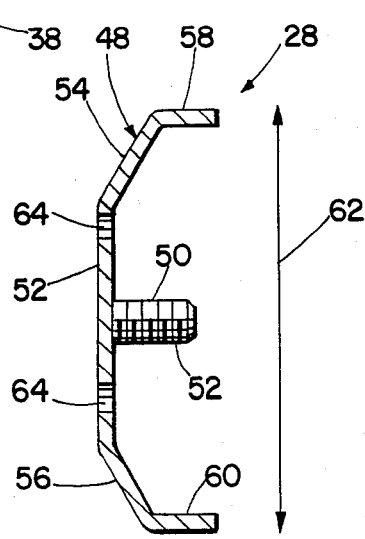
FIG. 5 is a side view of the locking cap of FIG. 4.

The nut lock assembly 10 additionally comprises a locking cup 26, which may be seen in greater detail by reference to FIGS. 2 and 3, and a locking cap 28, which may be seen in greater detail by reference to FIGS. 4 and 5.

Locking cup 26, which may be a sheet metal stamping or a molded part or the like, includes an axially extending hub portion 30 and a transversely extending flange portion 32. The hub portion 30 defines an opening or aperture 34, therethrough of a configuration closely conforming to the exterior configuration of the nut 12. In the illustrated embodiment, aperture 34 in hub 30 is defined by six interior generally flat walls 36 which will fit tightly upon the exterior flat surfaces of hex nut 12 to nonrotationally fix the locking cup 26 to the nut 12 for joint rotation. Of course, any interior configuration of opening 34 which will rotationally fix locking cup 26 to the exterior periphery of nut 12 is suitable for purposes of the present invention. The outer periphery of the flange portion 32 of locking cup 26 defines a plurality of radially outwardly extending ramp or sawteeth 38. Each ramptype sawtooth 38 is defined by a generally radially outwardly extending flat surface or shoulder 40 and a radially outwardly inclined ramp surface 42. The inclined surfaces 42 of the saw or ratchet teeth 38 are radially outwardly inclined in the rotational direction opposite the hand of the external threads 16 on shaft 14. The saw or ratchet teeth 38 define a base radius 44 and a pitch radius 46. The difference between the base radius 44 and the pitch radius 46 is, of course, the radial length of shoulders 40.

Locking cap 28, as may be seen in greater detail by reference to FIGS. 4 and 5, comprises a resilient portion 48, preferably formed as a spring steel stamping or the like, to which is welded or attached by other known means an externally threaded stud 50. Externally threaded stud 50 carries left handed external threads 52 which are threadably engageable with internal threads 24 in internally threaded bore 22 of shaft 14. Resilient portion 48 includes a generally flat base section 52 and a pair of diametrically opposite arm or finger sections 54 and 56 which extend radially outwardly from the rotational axis of externally threaded stud 50. The free ends 58 and 60 of arm sections 54 and 56, respectively, are bent downwardly as seen in FIG. 4 and extends generally parallel to the rotational axis of stud 50. The separation 62 of free ends, or finger sections, 58 and 60, is equal to or slightly less than twice the base radius 44. Of course, any number of arm sections may be provided, provided the free ends thereof are separated from the axis of stud 50 by a distance slightly less than the base radius 44. Base portion 52 is provided with a pair of apertures 64 for engagement and rotation by a spanner wrench or the like. Of course, any tool engageable feature may be subsituted for apertures 64 as is well known in the art.

In operation, a standard right hand threaded hex nut 12, such as a pinion nut, is threaded (in a clockwise direction as viewed from the left of FIG. 1) onto the threaded end of the externally threaded shaft 14, such as a pinion gear shaft, until nut 12 abuts member 18 and applies the desired tension in shaft 14. Nut 12 is tightened, or torqued down on shaft 14 using standard assembly procedures. Locking cup 26 is then slip fitted over nut 12 whereby the internal flat surfaces 36 will engage the hex periphery of nut 12 to rotationally fix the locking cup 26 to the nut 12. The left hand threaded stud 50 is then inserted into the internal bore 20 in the end of shaft 14 and the locking cap 28 is then rotated (in a counterclockwise direction as viewed from the left of FIG. 1 and in FIG. 4). The locking cap is continuously rotated until seated on the end of shaft 14. During the seating of locking cap 28, the resilient spring fingers 58 and 60 will ratchet over ramp teeth 38 on the flange of locking cup 26. When seated, locking cap 28 will positively retain nut 12 in the desired rotational position on shaft 14. As externally threaded shaft 14 and stud 50 are threaded in an opposite direction, any tendency of nut 12 to rotate in the loosening direction relative to shaft 14 will result in a rotation in the counter clockwise direction of locking cup 26 (as viewed in FIG. 2). Any such a counter clockwise tendency of rotation of locking cup 26 will cause the flat surfaces or shoulders 40 of the ramp teeth 38 to engage spring fingers 58 and urge locking cap 28 to rotate in the counter clockwise direction (as viewed in FIG. 4). Such a counter clockwise rotation of locking cap 28 will result in further tightening of stud 50 within internally threaded bore 22 and thus such loosening will be positively resisted.

When it is desired to remove nut 12 from shaft 14, resilient spring fingers 58 and 60 are resiliently deformed radially outwardly to a separation at least twice as great as pitch radius 46 whereby the spring fingers will clear the ratchet teeth 38 and the locking cap 28 may be threaded off of the end of shaft 14 for later reuse.

It may thus be seen, that the nut lock assembly 10 of the present invention provides an improved locking cap type nut lock assembly for positively and selectively removably locking a standard nut to an externally threaded shaft. The externally threaded shaft is substantially standard with the exception of the provision of an axially extending internally threaded bore provided in the free end thereof. The nut lock assembly 10 allows the nut to be locked in any selected relative rotational position thereof relative to the externally threaded shaft and further provides a positive resistance to loosening rotation of the nut relative to the shaft which tends to increase with any rotation of the nut in the loosening or back off direction thereof. The locking cup and the resilient portion of the locking cap may be formed from relatively inexpensively and easily produced sheet metal stampings.

Although this invention has been described in its preferred form with a certain degree of particularity, it is understood that various modifications and substitutions of the parts may be resorted to without departing from the spirit and the scope of the invention as hereinafter claimed.

I claim:

1. A nut lock system for positively removably retaining a nut having a plurality of flat surfaces on the outer periphery thereof on the externally threaded end of a shaft, said system comprising;

an internally threaded bore formed in the end of said externally threaded shaft, the internal threads of said internally threaded bore of the opposite hand as the external threads of said externally threaded end of said shaft;

a locking cup member including a hub portion having a centrally located axially extending aperture therethrough and a transversely extending flange portion, said aperture configured to closely conform to the outer periphery of said nut whereby said locking cup member may be slipped onto said nut for rotationally fixing said locking cup member to said nut, the outer periphery of said flange portion provided with a plurality of radially outwardly extending ramp type ratchet teeth, each of said teeth defining a generally radially outwardly extending shoulder surface and a radially outwardly inclined ramp surface, said inclined ramp surfaces extending radially outwardly in the opposite circumferential direction as the direction of rotation of said nut being tightened onto said shaft, and a locking cap member comprising a resiliently deformable portion and an externally threaded stud portion fixed thereto, said externally threaded stud portion threadably receivable in said internally threaded bore formed in the end of said externally threaded shaft, said resiliently deformable portion comprising a generally flat transversely extending base section and outwardly extending finger section, the free ends of said finger section extending generally parallel to said stud portion and in the same direction, the free end of said finger section, in the nondeformed position thereof, separated from the rotational axis of said stud by a distance equal to or less than the radius defined by the most radially inwardly points of said shoulder surfaces of said ratchet teeth, said base section provided with a fitting for receipt of a tool engageable with the side of said base section opposite the side from which said externally threaded stud extends, said free end of said finger sections ratchetly engaged with the ratchet teeth on said locking cup member when said base section abuts the end of said shaft.

2. The system of claim 1 wherein said resilient portion comprises a pair of generally diametrically opposite radially outwardly extending finger sections, the free ends of said finger sections separated by a distance, measured generally perpendicular to the axis of said stud, equal to or less than the diameter defined by the most radially inward points of said shoulder surfaces of said ratchet teeth.

3. The system of claim 2 wherein said locking cup is a one-piece spring steel stamping.

* * * * *